Sept. 12, 1961 L. J. STURMER 2,999,711
ANTI-SKID SANDING DEVICE
Filed April 24, 1959 2 Sheets-Sheet 1

INVENTOR.
LEONARD J. STURMER
BY
McMorrow, Berman & Davidson
ATTORNEYS

Sept. 12, 1961 L. J. STURMER 2,999,711
ANTI-SKID SANDING DEVICE
Filed April 24, 1959 2 Sheets-Sheet 2
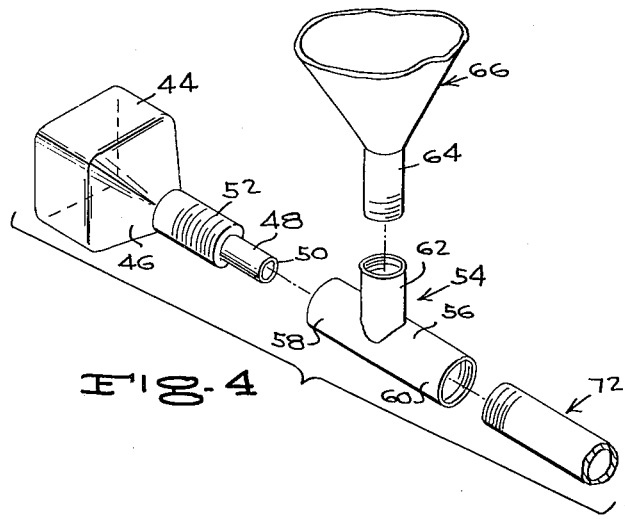
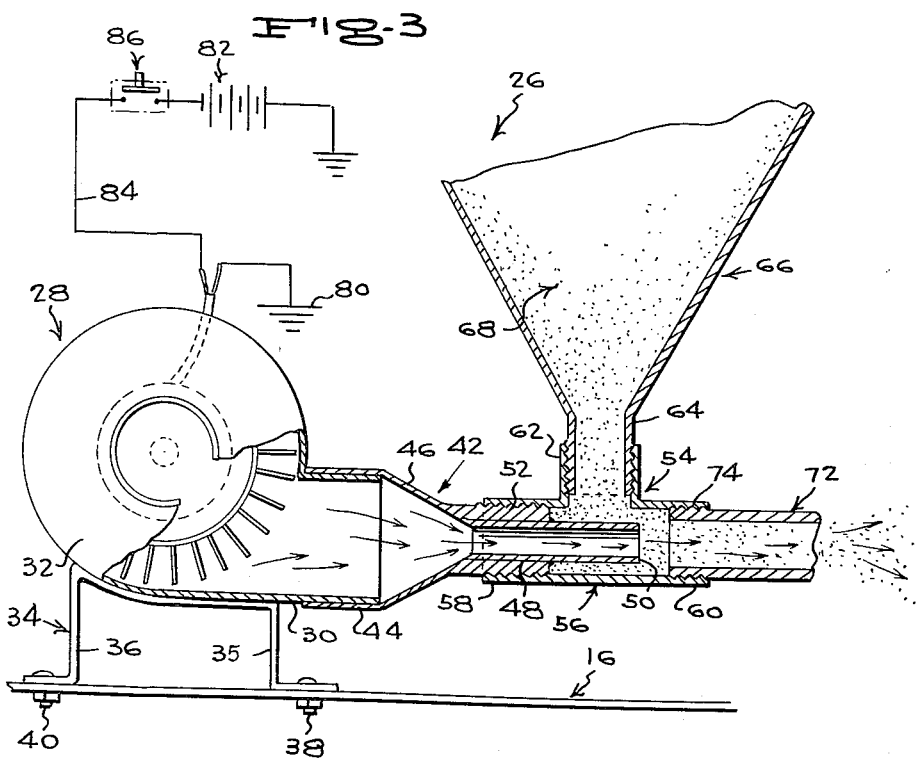
INVENTOR.
LEONARD J. STURMER
BY
McMorrow, Berman & Davidson
ATTORNEYS

United States Patent Office 2,999,711
Patented Sept. 12, 1961

2,999,711
ANTI-SKID SANDING DEVICE
Leonard J. Sturmer, 1128 Pierce Ave., Niagara Falls, N.Y.
Filed Apr. 24, 1959, Ser. No. 808,716
1 Claim. (Cl. 291—3)

This invention relates to an improved anti-skid blower-operated sanding device for vehicle wheels.

The primary object of the invention is to provide more efficient and more compact devices of the kind indicated which are especially, but not exclusively, designed for installation in the trunk compartments of vehicles, as on the floor or a wall thereof, one at each side thereof for sanding the rear wheels, in a manner to occupy a minimum of space therein.

Another object of the invention is to provide a device of the character indicated above which is uncomplex in construction, is composed of a small number of simple and easily assembled parts, can be made in durable and rugged forms to sell in garages and accessory stores, and is adapted for easy and quick installation either by mechanics or by automobile owners.

A further object of the invention is to provide a device of the character indicated above employing an electric blower which is run off the battery of an automobile and is controlled by a switch located conveniently in the driving compartment.

Other important objects and advantageous features of the invention will be apparent from the following description and the accompanying drawings, wherein, for purposes of illustration only, a specific form of the invention is set forth in detail.

In the drawings:

FIGURE 3 is an enlarged, fragmentary schematic view, partly in vertical longitudinal section, showing the components of a device and its electrical connections; and FIGURE 4 is an exploded perspective view, on a reduced scale, of the device with the blower removed.

Figure 1:
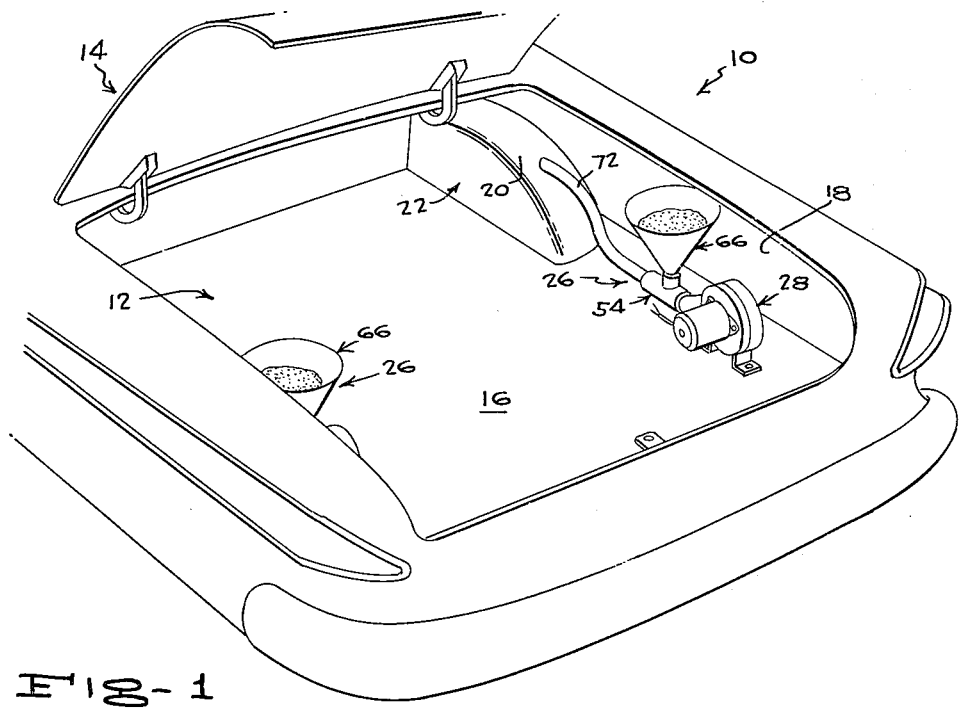
FIGURE 1 is a fragmentary perspecive view showing devices of the invention installed in an automobile trunk compartment, the lid of which is shown open.
Figure 2:
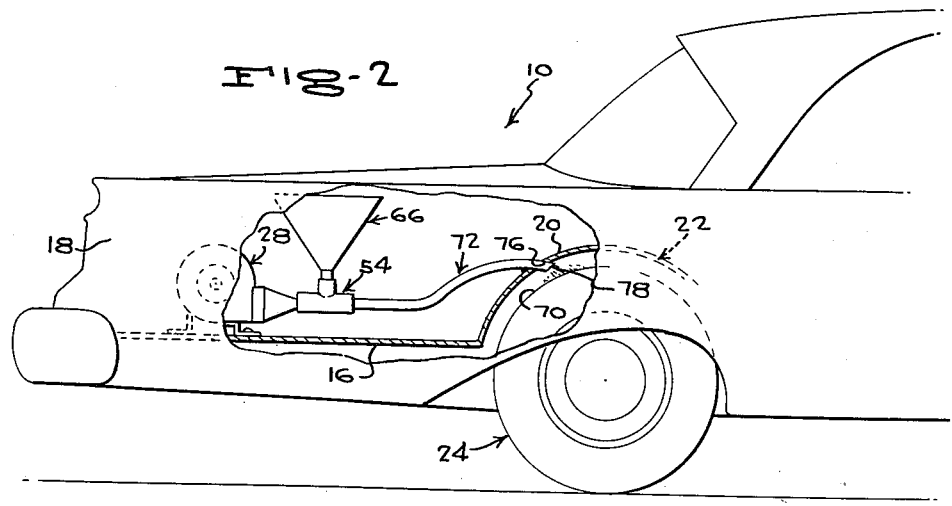
FIGURE 2 is a fragmentary right-hand side elevation of FIGURE 1, partly broken away and in section, showing the projection of the sand projecting pipe of a device through a rear wheel housing.

Referring in detail to the drawings, wherein like numerals designate like parts throughout the several views, the numeral 10 generally designates a passenger automobile having a rear trunk compartment 12 closed by a hinged lid 14, and having a floor 16, and side walls 18. In certain makes or models of automobiles the floor 16 adjacent the side walls is deformed to define upstanding arcuate portions 20 of housings 22 for the rear wheels 24 thereof, in which, as shown in FIGURE 2, the upper parts of the wheels are positioned.

For projecting and applying sand to the top of each of the wheels 24, within the housing 22, there are provided, in accordance with the present invention, individual sanding devices, generally designated 26. Each device 26 comprises a rotary electric blower 28, which has a tangential, and preferably rectangular and horizontal outlet neck 30 projecting forwardly from its casing 32 at the underside thereof. A mounting bracket 34 is fixed longitudinally on the underside of the blower casing 32 and preferably has forward and rear feet 35 and 36, respectively, which are adapted to be suitably secured, as by means of bolts 38 and 40, respectively, to the trunk compartment floor 16, close to a related side wall 18, or permissibly on the side wall.

The device 26 further comprises a reducing air jet assembly 42 which has on its rear end a telescoping connector 44 of the same cross section as the blower outlet neck 30, and to have a close sliding fit thereover. The connector 44 has a forwardly tapered forward portion 46 which terminates in a reduced diameter, preferably cylindrical jet tube 48 having an open forward end 50. Suitably fixed around the tapered portion 46 and a rear part of the jet tube 48 is a concentric longitudinal and externally threaded sleeve 52, which serves as a reinforcement for the jet tube and as a coupling for assembling an inverted tubular T-fitting 54.

The T-fitting 54 comprises a horizontal longitudinal head 56 having a rear internally threaded arm 58 which is threaded onto the sleeve 52, and a forward internally threaded arm 60. The head 56 is longer than and is substantially larger in diameter than, and is concentrically spaced around the jet tube 48. The T-fitting 54 further comprises an upstanding, internally threaded standard 62, into which is supportably threaded the reduced neck 64 on the lower end of a funnel-shaped sand hopper 66, which can be of any suitable cross section, and be provided with a cover (not shown) for its open upper end if desired.

As shown in FIGURE 3, the open end 50 of the jet tube 48 is located forwardly of and just beyond the standard 62 of the T-fitting, and is spaced rearwardly from the forward end of the forward arm 60, so that air forced by the blower 28 through the jet tube 48 is confined to forward movement through the forward arm 60 of the T-fitting and is prevented from jetting upwardly through the standard 62 and disturbing free gravitational flow of sand 68 from the hopper 66 into the T-fitting head 56, around the jet tube. The forward jetting of air from the jet tube 48 acts to push sand forwardly through the forward arm 60 and at the same time creates a suction around the jet tube which acts to pull sand from around the jet tube to the forward end of the jet tube, so as to constantly supply the stream of sand being jetted forwardly through the forward arm 60 of the T-fitting.

For applying sand at high speed and pressure to the tread of a related rear wheel tire 70, at the top thereof, and lending additional support to the device 26, a preferably rigid sand projecting pipe 72 is threaded at its rear end, as indicated at 74, to the forward end of the forward fitting arms 60, and extends horizontally and forwardly therefrom, and through a single hole 76, made in the portion 20 of the related wheel housing 22. The pipe 72 has a preferably beveled forward open end 78 which, as shown in FIGURE 2, is located above and slightly to the rear of the vertical centerline of the wheel tire tread, so that sand is applied onto the tread at the top thereof, for non-skid contact with the ground as the wheel is rotated. It is to be noted that in the absence of an upset wheel housing 22, the pipe 72 is passed supportably through any existing structure to position its discharge end 78 relative to the tire tread as above described.

It will also be noted that installation of a device 26 requires no other or greater mutilation of an automobile than the drilling of the hole 76 for the pipe 72, and holes for the bracket bolts 38, 40.

As indicated in FIGURE 3, wiring of the blower 28 to the electrical system of an automobile can involve simply grounding one side of the blower motor, as to the trunk compartment floor, as indicated at 80, the connection of the other side of the motor to the ungrounded side of the automobile battery 82, by means of an insulated wire 84, with a switch 86 connected in the wire 84. Where a pair of the devices 26 is installed, they can be readily wired to operate off the same switch or off individual switches, and, in either case, the driver has available means for instantly and effectively applying and stopping the application of sand to the rear wheels, whenever desired.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claim appended hereto.

What is claimed is:

An automobile wheel sanding device comprising an electric blower, means for mounting the blower on a part of an automobile, an air jet assembly extending from and communicating with said blower, said assembly comprising a horizontal tubular head, a reduced diameter jet tube extending forwardly through said head and spaced from the interior of the head, said head having a closed rear end and an open forward end and said jet tube having an open forward end spaced rearwardly from the forward end of the head, a gravity feed and hopper mounted on said jet assembly and communicating with the interior of said head at a point behind the open forward end of the jet tube, and a sand projecting pipe having a rear end connected to the forward end of said head.

References Cited in the file of this patent

UNITED STATES PATENTS

| | | |
|---|---|---|
| 1,497,198 | Sherwin | June 10, 1924 |
| 1,625,746 | Rosenthal | Apr. 19, 1927 |
| 1,975,346 | Borchek et al. | Oct. 2, 1934 |
| 2,223,722 | Farrell | Dec. 3, 1940 |
| 2,626,823 | Storberg | Jan. 27, 1953 |
| 2,672,361 | Werbe | Mar. 16, 1954 |
| 2,722,441 | Belperche | Nov. 1, 1955 |
| 2,725,247 | Saari et al. | Nov. 29, 1955 |
| 2,863,687 | Benis et al. | Dec. 9, 1958 |
| 2,933,337 | Katz | Apr. 19, 1960 |